(No Model.)
G. H. STOCKMANN.
SHEARS.
No. 513,542. Patented Jan. 30, 1894.
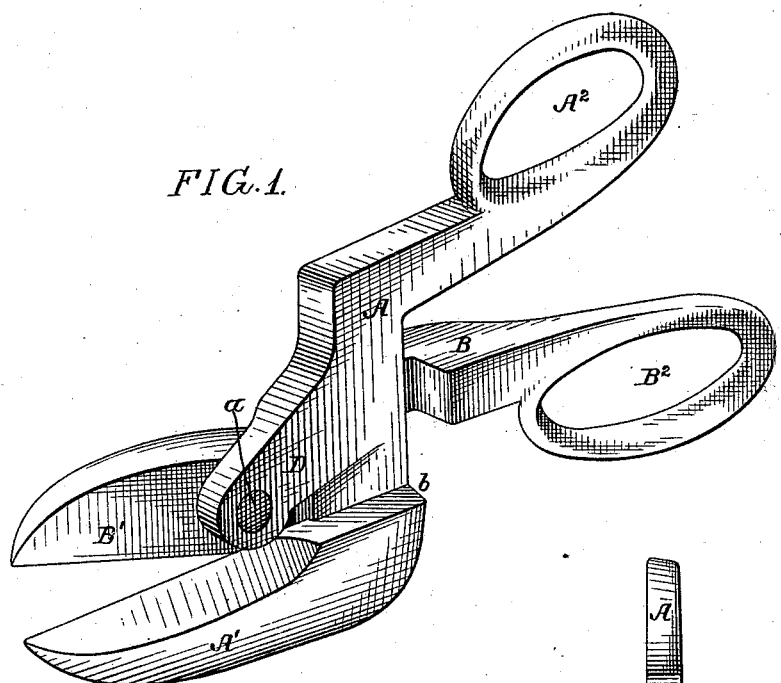
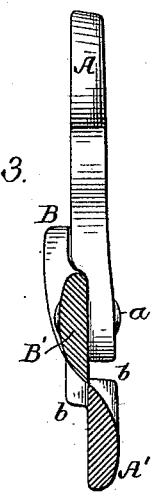
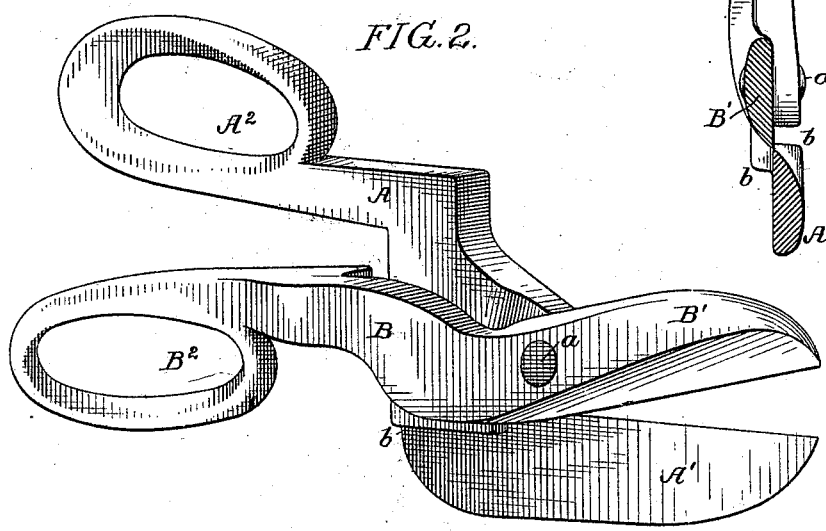
Witnesses:
A. V. Groups
Alex Barkoff
Inventor:
George H. Stockmann
by his Attorneys
Howson & Howson

UNITED STATES PATENT OFFICE.

GEORGE H. STOCKMANN, OF PHILADELPHIA, PENNSYLVANIA.

SHEARS.

SPECIFICATION forming part of Letters Patent No. 513,542, dated January 30, 1894.

Application filed April 25, 1892. Serial No. 430,547. (No model.)

*To all whom it may concern:*

Be it known that I, GEORGE H. STOCKMANN, a citizen of the United States, and a resident of Philadelphia, Pennsylvania, have invented certain Improvements in Shears for Cutting Sheet Metal, of which the following is a specification.

The object of my invention is to so construct a pair of shears for cutting sheet metal that powerful leverage may be exerted in effecting the cutting, and strips of any desired width can be cut without any such interference of any part of the shears with the cut strips as would prevent the forward movement of the shears in continuing the cut. This object I attain in the manner hereinafter set forth, reference being had to the accompanying drawings, in which—

Figure 1, is a perspective view of a pair of shears constructed in accordance with my invention. Fig. 2, is a similar view of the shears looking from the opposite side of the same; and Fig. 3, is a transverse sectional view of the shears.

The shears are composed of two levers A and B, the forward end of each lever constituting one of the blades A' or B' of the shears, and the rear end of each lever forming the handle $A^2$ or $B^2$.

Instead of pivoting the levers together where they cross, however, as is the usual plan, I extend forward from the lever A a tongue or finger D and pivot the lever B to said tongue or finger at $a$, this point being located adjacent to or in advance of the rear end of the cutting blade B' of said lever B so that the point at which the cut can begin is closely adjacent to the pivotal line of the shears. Hence very powerful leverage can be exerted in cutting and sheet metal of considerable thickness can be readily severed by the shears.

In order to provide for the proper clearance of the cut strips the lever A of the shears has a lateral offset $b$ formed in it in the rear of the blade A' so that one cut strip can pass rearward above said offset on one side of the lever, and the other strip can pass rearward beneath said offset on the other side of the lever. Corresponding lateral offsetting of the tongue or finger D and of the central portion of the lever B permits the desired close approach of the blades A' and B' of the shears and the location of the handles $A^2$ $B^2$ in the same vertical plane so as to facilitate the grasping of the same.

I do not here claim the combination of the two levers pivoted together and each having a cutting blade at the forward end, and an operating handle at the rear, one lever having the upper blade and lower handle, and the other lever having the lower blade and upper handle, the latter lever having also a lateral offset in the rear of its blade, and having a portion projecting forwardly beyond the rear end of said blade so as to provide for an advance of the pivot for the lever of the upper blade, as that forms the subject of a separate application filed by me on the 4th day of January, 1894, Serial No. 495,641.

Having thus described my invention, I claim and desire to secure by Letters Patent—

1. The within described shears, consisting of a pair of levers each having a cutting blade at its forward end, and a handle at the rear, the cutting blade of each lever being laterally offset in respect to the rear or handle portion, and one of the levers having a forwardly projecting and laterally offset finger, and a pin whereby the laterally offset blade of the other lever is pivoted to said laterally offset finger, substantially as specified.

2. The within described shears consisting of a pair of levers each having a cutting blade at its forward end, and a handle at the rear, one of said levers being laterally offset in the rear of said blade and having a forwardly projecting and correspondingly offset finger above its blade, and the other lever being hung to said finger and having a central portion offset in respect to both ends so as to permit proper action of the blades and proper alignment of the handles, substantially as specified.

In testimony whereof I have signed my name to this specification in the presence of two subscribing witnesses.

GEORGE H. STOCKMANN.

Witnesses:
HERBERT PUSEY,
HARRY SMITH.